(12) United States Patent
McMahan et al.

(10) Patent No.: US 8,966,910 B2
(45) Date of Patent: Mar. 3, 2015

(54) METHODS AND SYSTEMS FOR COOLING A TRANSITION NOZZLE

(75) Inventors: Kevin Weston McMahan, Greer, SC (US); Ronald James Chila, Greenville, SC (US); David Richard Johns, Greenville, SC (US)

(73) Assignee: General Electric Company, Schenectady, NY (US)

( * ) Notice: Subject to any disclaimer, the term of this patent is extended or adjusted under 35 U.S.C. 154(b) by 505 days.

(21) Appl. No.: 13/164,887

(22) Filed: Jun. 21, 2011

(65) Prior Publication Data

US 2012/0328421 A1  Dec. 27, 2012

(51) Int. Cl.
| | |
|---|---|
| B21K 25/00 | (2006.01) |
| F02C 1/00 | (2006.01) |
| F01D 9/02 | (2006.01) |
| F23R 3/00 | (2006.01) |
| F23R 3/06 | (2006.01) |
| F23R 3/34 | (2006.01) |

(52) U.S. Cl.
CPC ............... *F01D 9/023* (2013.01); *F23R 3/002* (2013.01); *F23R 3/06* (2013.01); *F23R 3/346* (2013.01); *F05D 2260/20* (2013.01); *Y02T 50/675* (2013.01); *F23R 2900/03041* (2013.01); *F23R 2900/03042* (2013.01)
USPC ............................. 60/752; 60/746; 29/889.22

(58) Field of Classification Search
USPC ......................................... 60/39.37, 752–760
See application file for complete search history.

(56) References Cited

U.S. PATENT DOCUMENTS

| | | | |
|---|---|---|---|
| 2,958,194 A * | 11/1960 | Bayler ............................ | 60/760 |
| 4,719,748 A | 1/1988 | Davis, Jr. et al. | |
| 4,984,429 A | 1/1991 | Waslo et al. | |
| 5,414,999 A * | 5/1995 | Barnes ............................ | 60/722 |
| 5,906,093 A * | 5/1999 | Coslow et al. .................. | 60/777 |
| 6,018,950 A * | 2/2000 | Moeller ........................ | 60/752 |
| 6,021,570 A | 2/2000 | Lockyer et al. | |
| 6,098,397 A * | 8/2000 | Glezer et al. .................... | 60/772 |
| 6,205,789 B1 | 3/2001 | Patterson et al. | |
| 6,546,627 B1 * | 4/2003 | Sekihara et al. ............. | 29/889.1 |
| 6,568,187 B1 | 5/2003 | Jorgensen et al. | |
| 6,640,547 B2 | 11/2003 | Leahy, Jr. | |
| 6,681,578 B1 | 1/2004 | Bunker | |
| 6,761,031 B2 | 7/2004 | Bunker | |
| 7,007,482 B2 | 3/2006 | Green et al. | |
| 7,082,766 B1 * | 8/2006 | Widener et al. ................. | 60/752 |
| 7,104,067 B2 | 9/2006 | Bunker | |
| 7,373,778 B2 | 5/2008 | Bunker et al. | |
| 7,386,980 B2 | 6/2008 | Green et al. | |
| 7,493,767 B2 * | 2/2009 | Bunker et al. .................. | 60/752 |
| 7,617,684 B2 | 11/2009 | Norster | |
| 7,886,545 B2 * | 2/2011 | Lacy et al. ...................... | 60/804 |
| 2001/0049932 A1 * | 12/2001 | Beebe .......................... | 60/39.06 |
| 2006/0042255 A1 * | 3/2006 | Bunker et al. .................. | 60/752 |
| 2007/0193274 A1 * | 8/2007 | Belsom .......................... | 60/773 |
| 2010/0037620 A1 | 2/2010 | Chila | |
| 2010/0050650 A1 * | 3/2010 | Patel et al. ..................... | 60/754 |

(Continued)

*Primary Examiner* — Gerald L Sung
(74) *Attorney, Agent, or Firm* — Armstrong Teasdale LLP

(57) ABSTRACT

A turbine assembly includes a fuel nozzle configured to mix fuel and air and a transition nozzle oriented to receive the fuel and air mixture from the fuel nozzle. The transition nozzle includes a transition portion and a nozzle portion integrally formed with the transition portion. The transition nozzle includes a plurality of openings oriented to channel air to facilitate cooling the transition portion and/or the nozzle portion. The transition portion is oriented to channel combustion gases towards the nozzle portion.

18 Claims, 2 Drawing Sheets

(56) References Cited

U.S. PATENT DOCUMENTS

| | | |
|---|---|---|
| 2010/0071379 A1 | 3/2010 | Woodcock et al. |
| 2010/0077761 A1 | 4/2010 | Johnson et al. |
| 2010/0077763 A1 | 4/2010 | Alkabie |
| 2010/0115953 A1* | 5/2010 | Davis et al. .................... 60/737 |
| 2010/0170257 A1* | 7/2010 | Chila et al. .................... 60/754 |
| 2010/0205972 A1* | 8/2010 | Chila et al. .................... 60/752 |
| 2010/0218502 A1* | 9/2010 | Chila et al. .................... 60/752 |
| 2010/0257863 A1* | 10/2010 | Chila et al. .................... 60/755 |

\* cited by examiner

METHODS AND SYSTEMS FOR COOLING A TRANSITION NOZZLE

BACKGROUND

The present disclosure relates generally to turbine systems and, more particularly, to a transition nozzle that may be used with a turbine system.

At least some known gas turbine systems include a combustor that is distinct and separate from a turbine. During operation, some such turbine systems may develop leakages between the combustor and the turbine that may impact the emissions capability (i.e., NOx) of the combustor and/or may decrease the performance and/or efficiency of the turbine system.

To reduce such leakages, at least some known turbine systems include a plurality of seals between the combustor and the turbine. Over time, however, operating at increased temperatures may weaken the seals between the combustor and turbine. Maintaining such seals may be tedious, time-consuming, and/or cost-inefficient.

Additionally or alternatively, to increase emissions capability, at least some known turbine systems increase an operating temperature of the combustor. For example, flame temperatures within some known combustors may be increased to temperatures in excess of about 3900° F. However, increased operating temperatures may adversely limit a useful life of the combustor and/or turbine system.

BRIEF DESCRIPTION

In one aspect, a method is provided for assembling a turbine assembly. The method includes integrally forming a transition nozzle including a transition portion and a nozzle portion. The transition nozzle includes a plurality of openings oriented to channel air to facilitate cooling the transition portion and/or the nozzle portion. The transition portion is oriented to channel combustion gases towards the nozzle portion.

In another aspect, a transition nozzle is provided for use with a turbine assembly. The transition nozzle is a transition portion and a nozzle portion integrally formed with the transition portion. The transition nozzle includes a plurality of openings oriented to channel air to facilitate cooling the transition portion and/or the nozzle portion. The transition portion is oriented to channel combustion gases towards the nozzle portion.

In yet another aspect, a turbine assembly is provided. The turbine assembly includes a fuel nozzle configured to mix fuel and air to create a fuel and air mixture and a transition nozzle oriented to receive the fuel and air mixture from the fuel nozzle. The transition nozzle includes a transition portion and a nozzle portion integrally formed with the transition portion. The transition nozzle includes a plurality of openings oriented to channel air to facilitate cooling the transition portion and/or the nozzle portion. The transition portion is oriented to channel combustion gases towards the nozzle portion.

The features, functions, and advantages described herein may be achieved independently in various embodiments of the present disclosure or may be combined in yet other embodiments, further details of which may be seen with reference to the following description and drawings.

DETAILED DESCRIPTION

The subject matter described herein relates generally to turbine assemblies and more particularly to a transition nozzle that may be used with a turbine assembly. In one embodiment, the transition nozzle is a unitary component including a liner portion, a transition portion, and a nozzle portion. In such an embodiment, the transition nozzle includes a plurality of openings that are oriented to channel relatively cool air to facilitate cooling the transition nozzle. As such, the transition nozzle uses effusion and/or film cooling globally across the transition nozzle such that a combustor may operate with increased operating temperatures and, thus, operate with increased emissions capabilities.

As used herein, the terms "axial" and "axially" refer to directions and orientations extending substantially parallel to a longitudinal axis of a combustor. As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
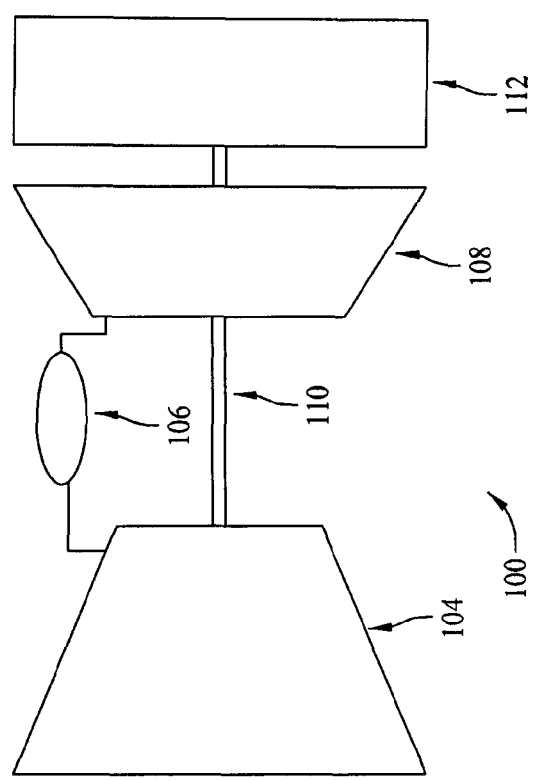
FIG. 1 is a schematic illustration of an exemplary turbine assembly.

FIG. 1 is a schematic illustration of an exemplary turbine assembly 100. In the exemplary embodiment, turbine assembly 100 includes, coupled in a serial flow arrangement, a compressor 104, a combustor assembly 106, and a turbine 108 that is rotatably coupled to compressor 104 via a rotor shaft 110.

During operation, in the exemplary embodiment, ambient air is channeled through an air inlet (not shown) towards compressor 104. The ambient air is compressed by compressor 104 prior it to being directed towards combustor assembly 106. In the exemplary embodiment, compressed air is mixed with fuel, and the resulting fuel-air mixture is ignited within combustor assembly 106 to generate combustion gases that are directed towards turbine 108. Moreover, in the exemplary embodiment, turbine 108 extracts rotational energy from the combustion gases and rotates rotor shaft 110 to drive compressor 104. Furthermore, in the exemplary embodiment, turbine assembly 100 drives a load 112, such as a generator, coupled to rotor shaft 110. In the exemplary embodiment, load 112 is downstream of turbine assembly 100. Alternatively, load 112 may be upstream from turbine assembly 100.

Figure 2:
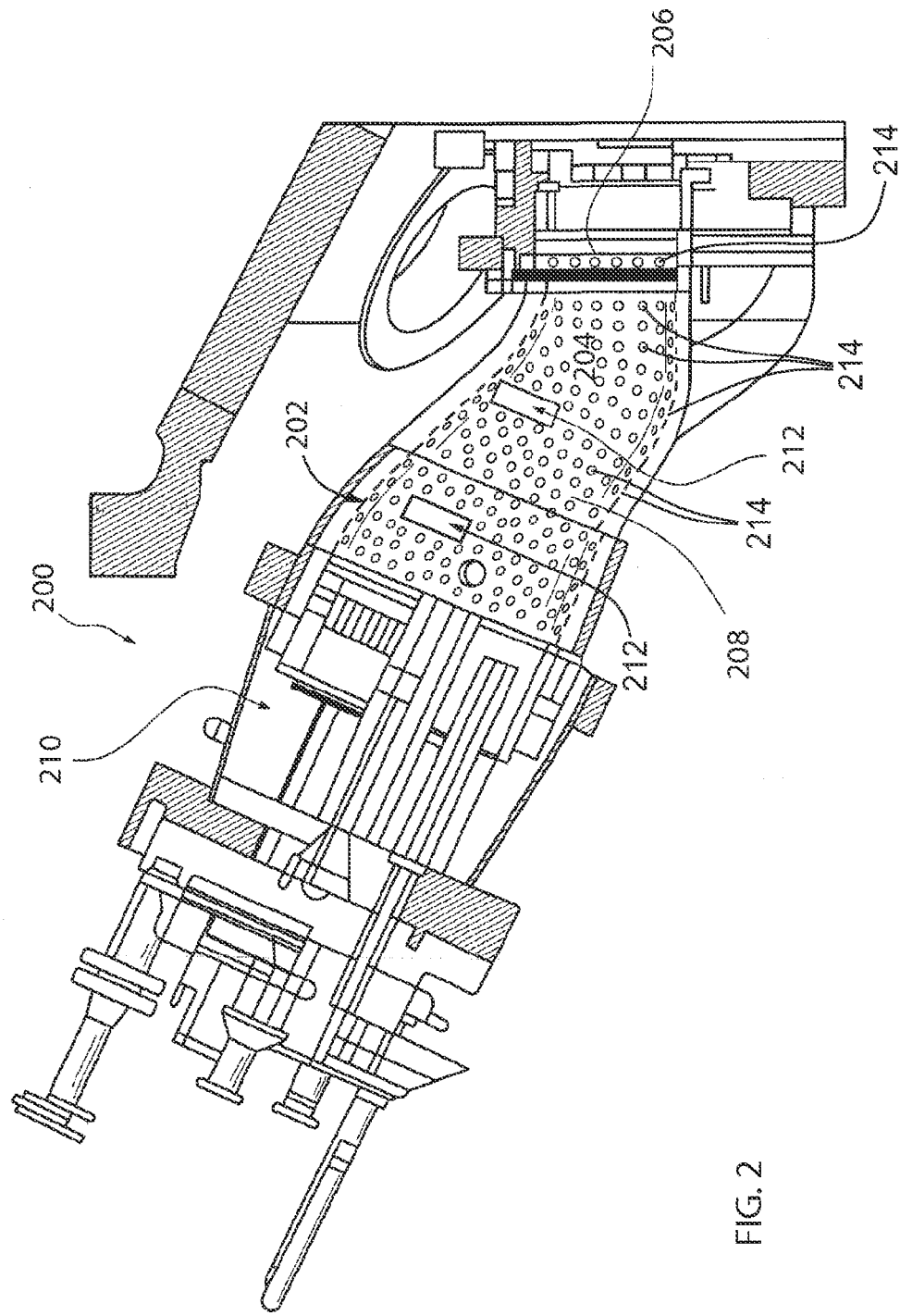
FIG. 2 is a cross-sectional view of an exemplary transition nozzle that may be used with the turbine assembly shown in FIG. 1.

FIG. 2 is a cross-sectional view of an exemplary transition nozzle 200 that may be used with turbine assembly 100. In the exemplary embodiment, transition nozzle 200 has a central axis that is substantially linear. Alternatively, transition nozzle 200 may have a central axis that is canted. Transition nozzle 200 may have any size, shape, and/or orientation suitable to enable transition nozzle 200 to function as described herein.

In the exemplary embodiment, transition nozzle 200 includes in serial flow arrangement a combustion liner portion 202, a transition portion 204, and a turbine nozzle portion 206. In the exemplary embodiment, at least transition portion 204 and nozzle portion 206 are integrated into a single, or unitary, component. More particularly, in the exemplary embodiment, liner portion 202, transition portion 204, and nozzle portion 206 are integrated into a single, or unitary, component. For example, in one embodiment, transition nozzle 200 is cast and/or forged as a single piece.

In the exemplary embodiment, liner portion 202 defines a combustion chamber 208 therein. More specifically, in the exemplary embodiment, liner portion 202 is oriented to receive fuel and/or air at a plurality of different locations (not shown) spaced along an axial length of liner portion 202 to enable fuel flow to be locally controlled for each combustor (not shown) of combustor assembly 106. Thus, localized control of each combustor facilitates combustor assembly 106 to operate with a substantially uniform fuel-to-air ratio within combustion chamber 208. For example, in the exemplary embodiment, liner portion 202 receives a fuel and air mixture from at least one fuel nozzle 210 and receives fuel from a second stage fuel injector 212 that is downstream from fuel nozzle 210. In another embodiment, a plurality of individually-controllable nozzles are spaced along the axial length of liner portion 202. Alternatively, the fuel and air may be mixed within chamber 208.

In the exemplary embodiment, the fuel and air mixture is ignited within chamber 208 to generate hot combustion gases. In the exemplary embodiment, transition portion 204 is oriented to channel the hot combustion gases downstream towards nozzle portion 206 or, more particularly, towards a stage 1 nozzle 206. In one embodiment, transition portion 204 includes a throttled end (not shown) that is oriented to channel hot combustion gases at a desired angle towards a stage 1 turbine bucket (not shown). In such an embodiment, the throttled end functions as the stage 1 nozzle. Additionally or alternatively, transition portion 204 may include an extended shroud (not shown) that substantially circumscribes the stage 1 nozzle in an orientation that enables the extended shroud and the stage 1 nozzle to direct the hot combustion gases at a desired angle towards the stage 1 turbine bucket.

In the exemplary embodiment, transition nozzle 200 includes a plurality of openings 214 that are oriented to channel air therethrough to facilitate cooling liner portion 202, transition portion 204, and/or nozzle portion 206. More specifically, in the exemplary embodiment, openings 214 provide film and/or effusion cooling to transition nozzle 200 by supplying a film of cooling air across an inner surface of liner 202, across an inner surface of transition portion 204, and/or across an inner surface of nozzle portion 206. In the exemplary embodiment, openings 214 extend through a sidewall of liner portion 202, through a sidewall of transition portion 204, and/or through a sidewall of nozzle portion 206.

In the exemplary embodiment, openings 214 are generally small, closely-spaced openings that channel air to provide a layer of cooling air into an interior of the sidewall of liner portion 202, transition portion 204, and/or nozzle portion 206. For example, in one embodiment, compressed air, nitrogen, and/or any other suitable gas may be channeled through openings 214 to enable nozzle 200 to be cooled as described herein. The size, shape, orientation, and/or density (i.e., relative spacing) of openings 214 may vary, for example, according to an operating temperature of combustor assembly 106 and/or based on a desired amount of cooling needed, for example, to maintain a specific operating temperature. Openings 214 may be created using various processes, including drilling techniques such as electrical-discharge machining (EDM), stationary percussion laser machining, water jet, and/or percussion on-the-fly laser drilling. Alternatively, complex casting techniques and/or any other fabrication process may be used to provide openings 214.

During operation, in the exemplary embodiment, a fuel and air mixture is combusted within combustion chamber 208 to generate combustion gases that are subsequently channeled towards nozzle portion 206. Air is channeled through openings 214 to facilitate cooling liner portion 202, transition portion 204, or nozzle portion 206. More particularly, in the exemplary embodiment, the cooling air is directed to form a buffer layer along the sidewalls defining chamber 208. The buffering layer facilitates shielding the sidewalls from high temperature combustion gases. Additionally, the cooling air convectively cools the liner portion sidewall, transition portion sidewall, and/or nozzle portion sidewall as the cooling air flows through openings 214.

The embodiments described herein facilitate reducing a quantity of components necessary to complete heat addition and/or flow throttling. For example, the embodiments described herein enable heat to be selectively concentrated within a turbine system and, thus, facilitate reducing a variation between chambers. Reducing the quantity of components enables a length of combustor and/or turbine to be shortened and facilitates reducing costs and/or outage time. Moreover, the effusion and/or film cooling enable the combustor to operate with increased operating temperatures and, thus, increased emissions capabilities.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the invention, including the best mode, and also to enable any person skilled in the art to practice those certain embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a turbine assembly, said method comprising:

integrally forming a transition nozzle including a transition portion and a turbine nozzle portion, wherein integrally forming includes manufacturing the transition nozzle as a unitary component such that the transition nozzle is a monolithic piece, and wherein the turbine nozzle portion functions as a stage one turbine nozzle;

orienting a plurality of openings in a sidewall of the transition nozzle to channel air across an inner surface of the transition nozzle to facilitate cooling at least one of the transition portion and the turbine nozzle portion, the transition nozzle including the plurality of openings; and orienting the transition portion to channel combustion gases downstream towards the turbine nozzle portion; and injecting fuel through at least one secondary fuel injector coupled along an axial length of the transition nozzle.

2. A method in accordance with claim 1, wherein integrally forming a transition nozzle further comprises integrally forming the transition nozzle to include a liner portion such that the liner portion, the transition portion, and the turbine nozzle portion forms the unitary component, wherein the transition portion is oriented to channel combustion gases from the liner portion.

3. A method in accordance with claim 2, wherein orienting a plurality of openings further comprises:

providing a first opening defined in a sidewall of the liner portion;
providing a second opening defined in a sidewall of the transition portion; and
providing a third opening defined in a sidewall of the turbine nozzle portion, wherein the plurality of openings includes the first, second, and third openings.

4. A method in accordance with claim 2, wherein orienting a plurality of openings further comprises providing an opening defined in a sidewall of the liner portion, wherein the plurality of openings includes the opening.

5. A method in accordance with claim 1, wherein orienting a plurality of openings further comprises providing an opening defined in a sidewall of the transition portion, wherein the plurality of openings includes the opening.

6. A method in accordance with claim 1, wherein orienting a plurality of openings further comprises providing an opening defined in a sidewall of the turbine nozzle portion, wherein the plurality of openings includes the opening.

7. A transition nozzle for use with a turbine assembly, said transition nozzle comprising:
a transition portion; and
a turbine nozzle portion integrally formed with the transition portion, wherein said transition portion and said turbine nozzle portion are manufactured as a unitary component such that the transition nozzle is a monolithic piece, and wherein said turbine nozzle portion functions as a stage one turbine nozzle;
a plurality of openings oriented in a sidewall of at least one of said transition portion and said turbine nozzle portion to channel air across an inner surface of said transition nozzle to facilitate cooling at least one of said transition portion and said turbine nozzle portion, wherein said transition portion is oriented to channel combustion gases downstream towards said turbine nozzle portion; and
at least one secondary fuel injector coupled along an axial length of the transition nozzle.

8. A transition nozzle in accordance with claim 7 further comprising a liner portion integrally formed with said transition and turbine nozzle portions to form said unitary component, wherein said transition portion is oriented to channel combustion gases from said liner portion.

9. A transition nozzle in accordance with claim 8, wherein said liner portion is configured to receive a fuel and air mixture at a plurality of locations along an axial length of said liner portion.

10. A transition nozzle in accordance with claim 8, wherein the plurality of openings includes a first opening extending through a sidewall of said liner portion, a second opening extending through said sidewall of said transition portion, and a third opening extending through said sidewall of said turbine nozzle portion.

11. A transition nozzle in accordance with claim 8, wherein at least one of the plurality of openings extends through a sidewall of said liner portion.

12. A turbine assembly comprising:
a primary fuel nozzle configured to mix fuel and air to create a fuel and air mixture; and
a transition nozzle oriented to receive the fuel and air mixture from said fuel nozzle, said transition nozzle comprising a transition portion and a turbine nozzle portion, wherein said transition portion and said turbine nozzle portion are manufactured as a unitary component such that the transition nozzle is a monolithic piece, and said transition nozzle includes a sidewall including a plurality of openings oriented to channel air across an inner surface of said transition nozzle to facilitate cooling at least one of said transition portion and said turbine nozzle portion,
wherein said transition portion is oriented to channel combustion gases downstream towards said turbine nozzle portion, and wherein said turbine nozzle portion functions as a stage one turbine nozzle; and
at least one secondary fuel injector coupled along an axial length of the transition nozzle downstream of said primary fuel nozzle, wherein said secondary fuel injector is configured to inject additional fuel to the fuel and air mixture.

13. A turbine assembly in accordance with claim 12, wherein said transition nozzle further comprises a liner portion integrally formed with said transition and turbine nozzle portions to form said unitary component, wherein said transition portion is oriented to channel combustion gases from said liner portion.

14. A turbine assembly in accordance with claim 13, wherein said liner portion is configured to receive the fuel and air mixture at a plurality of locations along an axial length of said liner portion.

15. A turbine assembly in accordance with claim 13, wherein the plurality of openings includes a first opening extending through a sidewall of said liner portion, a second opening extending through a sidewall of said transition portion, and a third opening extending through a sidewall of said turbine nozzle portion.

16. A turbine assembly in accordance with claim 13, wherein at least one of the plurality of openings extends through a sidewall of said liner portion.

17. A turbine assembly in accordance with claim 12, wherein at least one of the plurality of openings extends through a sidewall of said transition portion.

18. A turbine assembly in accordance with claim 12, wherein at least one of the plurality of openings extends through a sidewall of said turbine nozzle portion.

* * * * *